(12) United States Patent
Hong

(10) Patent No.: US 12,347,320 B2
(45) Date of Patent: Jul. 1, 2025

(54) VEHICLE, SERVER, METHOD OF CONTROLLING VEHICLE, AND METHOD OF CONTROLLING SERVER

(71) Applicants: Hyundai Motor Company, Seoul (KR); Kia Corporation, Seoul (KR)

(72) Inventor: Jeong Ki Hong, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 229 days.

(21) Appl. No.: 18/065,153

(22) Filed: Dec. 13, 2022

(65) Prior Publication Data
US 2023/0230487 A1 Jul. 20, 2023

(30) Foreign Application Priority Data
Jan. 18, 2022 (KR) .................. 10-2022-0007049

(51) Int. Cl.
*G08G 1/00* (2006.01)
*G05D 1/00* (2024.01)
*G05D 1/695* (2024.01)
*H04W 4/44* (2018.01)
*H04W 4/46* (2018.01)

(52) U.S. Cl.
CPC ............. *G08G 1/22* (2013.01); *G05D 1/0022* (2013.01); *G05D 1/695* (2024.01); *H04W 4/44* (2018.02); *H04W 4/46* (2018.02)

(58) Field of Classification Search
None
See application file for complete search history.

(56) References Cited

U.S. PATENT DOCUMENTS

| | | | | |
|---|---|---|---|---|
| 10,078,338 B2 * | 9/2018 | Smartt | ............. | B60W 60/0053 |
| 10,520,952 B1 * | 12/2019 | Luckevich | .......... | B60W 30/165 |
| 10,762,791 B2 * | 9/2020 | Switkes | ................ | H04W 4/029 |
| 2022/0277653 A1 * | 9/2022 | Lekutai | ................ | G05D 1/0295 |

* cited by examiner

*Primary Examiner* — Todd Melton
(74) *Attorney, Agent, or Firm* — Slater Matsil, LLP

(57) ABSTRACT

An embodiment vehicle includes a driving device, a V2V communication device, a V2I communication device, and a detecting device having a field of sensing in front of the vehicle. A controller is configured to control the driving device to perform a platoon of vehicles with a surrounding vehicle based on vehicle control information received from the surrounding vehicle through the V2V communication device and forward detection data from the detecting device, control the V2I communication device to transmit a remote control request to an external server upon determining that a distance between the vehicle and the platoon of vehicles is greater than or equal to a certain distance, control the driving device to drive based on a remote control instruction, and control to join the platoon of vehicles upon determining that the distance between the vehicle and the platoon of vehicles is less than the certain distance.

20 Claims, 12 Drawing Sheets

VEHICLE, SERVER, METHOD OF CONTROLLING VEHICLE, AND METHOD OF CONTROLLING SERVER

CROSS-REFERENCE TO RELATED APPLICATIONS

This application claims the benefit of Korean Patent Application No. 10-2022-0007049, filed on Jan. 18, 2022, which application is hereby incorporated herein by reference.

TECHNICAL FIELD

The present disclosure relates to a vehicle and a server for controlling platooning.

BACKGROUND

Generally, platooning is a method of exchanging vehicle control information of a lead vehicle (LV) via a vehicle to vehicle (V2V) communication, and based on the exchanged information driving together while maintaining a certain distance from the LV.

Platooning that drives while maintaining a certain distance from the LV allows air resistance of a following vehicle (FV) to be reduced, thereby increasing fuel efficiency and reducing risk of an accident.

In other words, the FV may drive autonomously in a platoon of vehicles based on vehicle control information received from the LV and outputs of various sensors provided in the FV vehicle.

SUMMARY

Various embodiments of the present disclosure provide a vehicle, a server, and a method of controlling the same that allow the vehicle to join platooning through remote control when the vehicle is separated from platooning.

Additional embodiments of the present disclosure will be set forth in part in the description which follows and, in part, will be obvious from the description, or may be learned by practice of the disclosure.

In accordance with an exemplary embodiment of the present disclosure, a vehicle includes a driving device for driving the vehicle, a vehicle to vehicle (V2V) communication device that communicates with one or more surrounding vehicles, a vehicle to infrastructure (V2I) communication device that communicates with an external server, a detecting device configured to have a field of sensing toward in front of the vehicle and obtain forward detection data, and a controller configured to control the driving device to perform a platoon of vehicles with the surrounding vehicles based on vehicle control information received from the surrounding vehicles through the V2V communication device and the forward detection data, control the V2I communication device to transmit a remote control request to the external server upon determining that a distance between the vehicle and the platoon of vehicles is greater than or equal to a certain distance based on the forward detection data, control the driving device to drive based on a remote control instruction upon receiving the remote control instruction from the external server, and control to join the platoon of vehicles upon determining that the distance between the vehicle and the platoon of vehicles falls within the certain distance based on the forward detection data.

The controller may be further configured to control the V2I communication device to transmit the remote control request in response to the distance between the vehicle and the platoon of vehicles being maintained for a predetermined time greater than or equal to the certain distance.

The controller may be further configured to, upon receiving the remote control instruction, control the V2V communication device to transmit vehicle control information corresponding to the remote control instruction to a following vehicle (FV) included in the platoon of vehicles.

The remote control instruction may include platooning information to increase a distance between the vehicle and the FV by an interval corresponding to a V2I communication delay.

The controller may be further configured to control to join the platoon of vehicles upon determining that the vehicle is located in the same lane as the platoon of vehicles and is located within the certain distance from the platoon of vehicles based on the forward detection data.

The controller may be further configured to control the V2I communication device to transmit a joining request to the external server when controlled to join the platoon of vehicles and control the V2V communication device to receive the vehicle control information from the vehicle included in the platoon of vehicles based on V2V communication information in response to receiving the V2V communication information in the platoon of vehicles from the external server.

The controller may be further configured to control the V2V communication device to transmit a joining request to a lead vehicle (LV) of the platoon of vehicles when controlled to join the platoon of vehicles and control the V2V communication device to receive the vehicle control information from the LV in response to receiving a joining permission signal from the LV.

The controller may be further configured to control the V2I communication device to transmit a remote control release request to the external server when joining the platoon of vehicles.

In accordance with another embodiment of the present disclosure, a server includes a communication device and a controller configured to, upon receiving a remote control request from a vehicle separated from a first platooning through the communication device, control the communication device to transmit a remote control instruction for a vehicle to join the first platooning, wherein the remote control instruction includes vehicle control information and platooning information for a second platooning of the vehicle and a vehicle following the vehicle (FV).

The controller may be further configured to generate the remote control instruction to include the platooning information to increase a distance between the vehicle and the FV by an interval corresponding to a V2I communication delay.

The controller may be further configured to control the communication device to transmit a joining request to a lead vehicle (LV) of the first platooning upon receiving the joining request for the first platooning from the vehicle and control the communication device to transmit V2V communication information in the first platooning to the vehicle upon receiving a joining permission signal from the LV.

The server may further include a user interface, wherein the controller is further configured to control the user interface to display a guideline for remote control of the second platooning, position information on a rank of the second platooning, and position information on a rank of the first platooning.

In accordance with another embodiment of the present disclosure, a method of controlling a vehicle including a driving device for driving the vehicle, a vehicle to vehicle (V2V) communication device for communicating with one or more surrounding vehicles, a vehicle to infrastructure (V2I) communication device for communicating with an external server, and a detecting device having a field of sensing toward in front of the vehicle and obtaining forward detection data includes controlling, by a controller, the driving device to perform a platoon of vehicles with the surrounding vehicles based on vehicle control information received from the surrounding vehicles through the V2V communication device and the forward detection data, controlling, by the controller, the V2I communication device to transmit a remote control request to the external server upon determining that a distance between the vehicle and the platoon of vehicles is greater than or equal to a certain distance based on the forward detection data, controlling, by the controller, the driving device to drive based on a remote control instruction upon receiving the remote control instruction from the external server, and controlling, by the controller, to join the platoon of vehicles upon determining that the distance between the vehicle and the platoon of vehicles falls within the certain distance based on the forward detection data.

The controlling of the V2I communication device may further include controlling, by the controller, the V2I communication device to transmit the remote control request in response to the distance between the vehicle and the platoon of vehicles being maintained for a predetermined time greater than or equal to the certain distance.

The method may further include, upon receiving the remote control instruction, controlling, by the controller, the V2V communication device to transmit vehicle control information corresponding to the remote control instruction to a following vehicle (FV) included in the platoon of the vehicle.

The remote control instruction may further include platooning information to increase a distance between the vehicle and the FV by an interval corresponding to a V2I communication delay.

The controlling to join the platoon of vehicles may further include controlling, by the controller, to join the platoon of vehicles upon determining that the vehicle is located in the same lane as the platoon of vehicles and is located within the certain distance from the platoon of vehicles based on the forward detection data.

The controlling to join the platoon of vehicles may further include controlling, by the controller, the V2I communication device to transmit a joining request to the external server when controlled to join the platoon of vehicles and controlling, by the controller, the V2V communication device to receive the vehicle control information from the vehicle included in the platoon of vehicles based on V2V communication information in response to receiving the V2V communication information in the platoon of vehicles from the external server.

The controlling to join the platoon of vehicles may further include controlling, by the controller, the V2V communication device to transmit a joining request to a lead vehicle (LV) of the platoon of vehicles when controlled to join the platoon of vehicles and controlling, by the controller, the V2V communication device to receive the vehicle control information from the LV in response to receiving a joining permission signal from the LV.

The controlling to join the platoon of vehicles may further include controlling, by the controller, the V2I communication device to transmit a remote control release request to the external server when joining the platoon of vehicles.

BRIEF DESCRIPTION OF THE DRAWINGS

These and/or other aspects of embodiments of the present disclosure will become apparent and more readily appreciated from the following description of exemplary embodiments, taken in conjunction with the accompanying drawings, in which.

DETAILED DESCRIPTION OF ILLUSTRATIVE EMBODIMENTS

Figure 1:
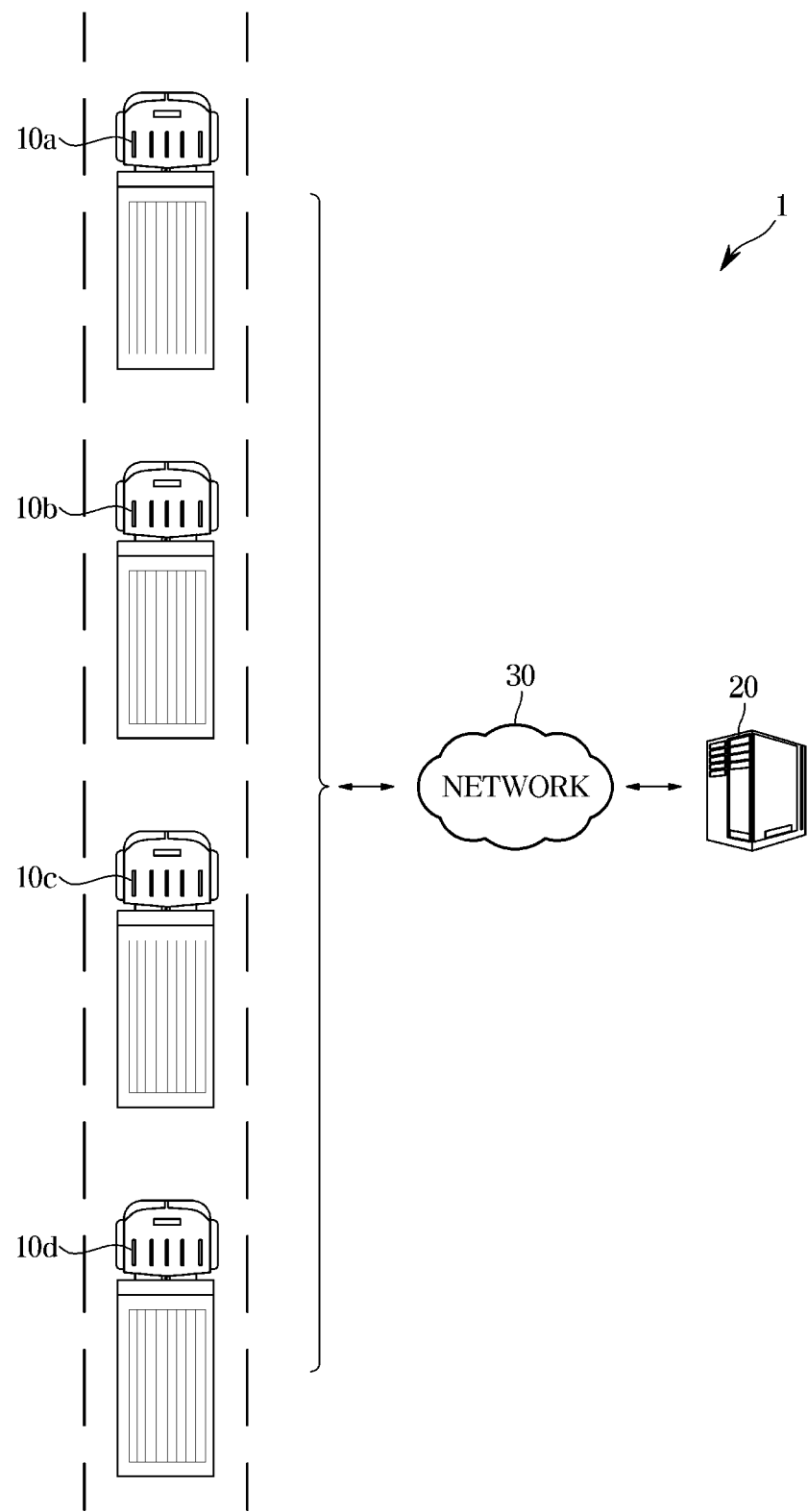
FIG. 1 shows a platooning remote control system according to an exemplary embodiment of the present disclosure.

Reference will now be made in detail to the embodiments of the present disclosure, examples of which are illustrated in the accompanying drawings, wherein like reference numerals refer to like elements throughout. This specification does not describe all elements of the disclosed embodiments and detailed descriptions of what is well known in the art or redundant descriptions on substantially the same configurations have been omitted. The terms 'part', 'module', 'member', 'block' and the like as used in the specification may be implemented in software or hardware. Further, a plurality of 'parts', 'modules', 'members', 'blocks' and the like may be embodied as one component. It is also possible that one 'part', 'module', 'member', 'block' and the like includes a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification and are not intended to preclude the possibility that one or more other elements may exist or may be added.

Throughout the specification, when a member is located "on" another member, this includes not only when one member is in contact with another member but also when another member is present between the two members.

The terms first, second, and the like are used to distinguish one component from another component, and the component is not limited by the terms described above.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 2A:
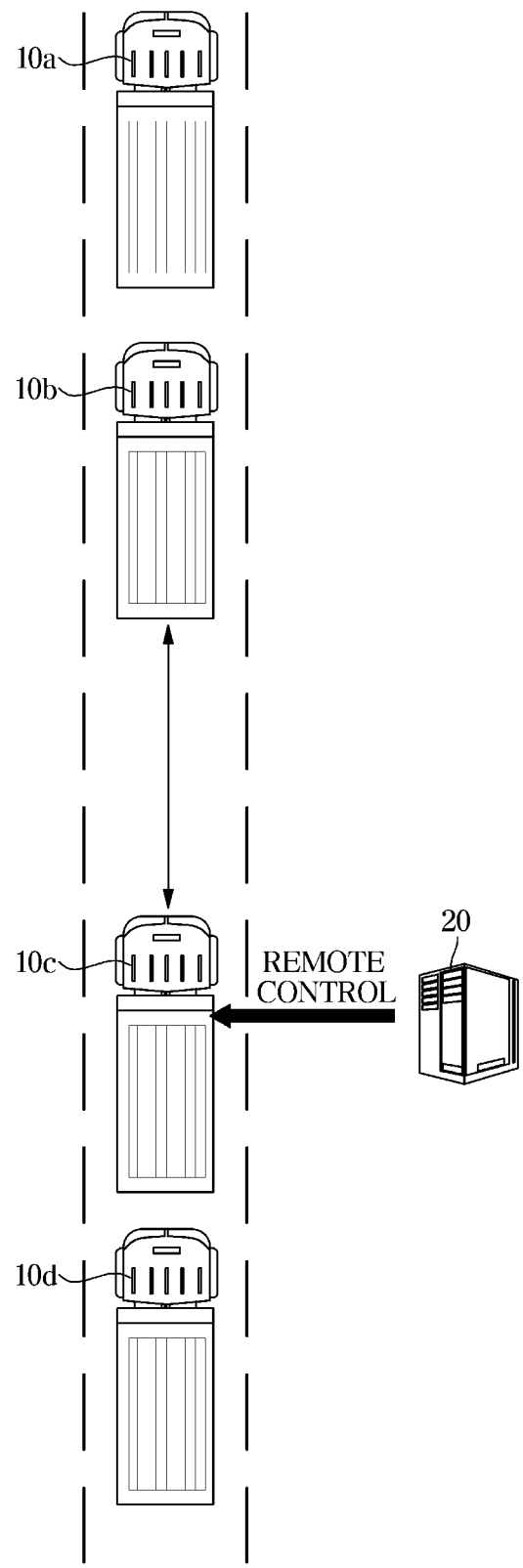
FIGS. 2A, 2B, and 2C show examples of a separation in platooning.
Figure 2B:
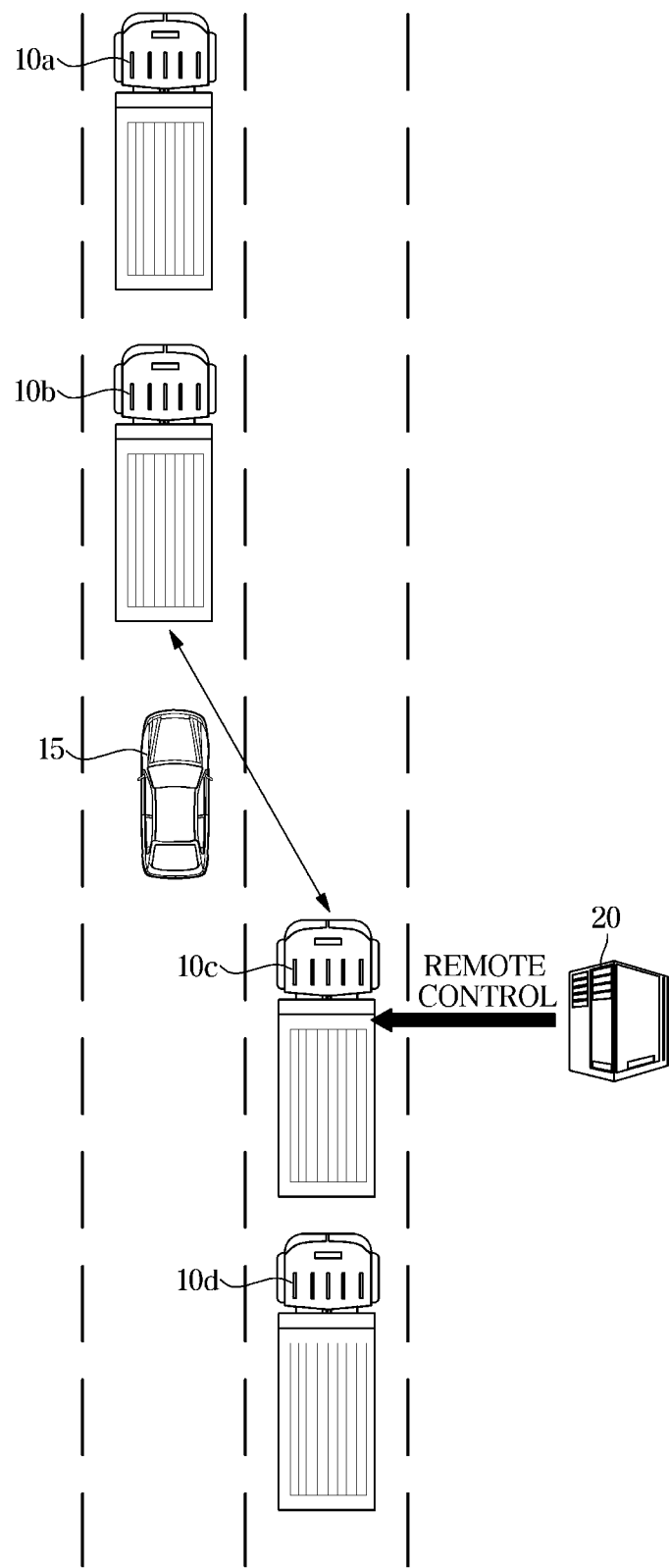
Figure 2C:
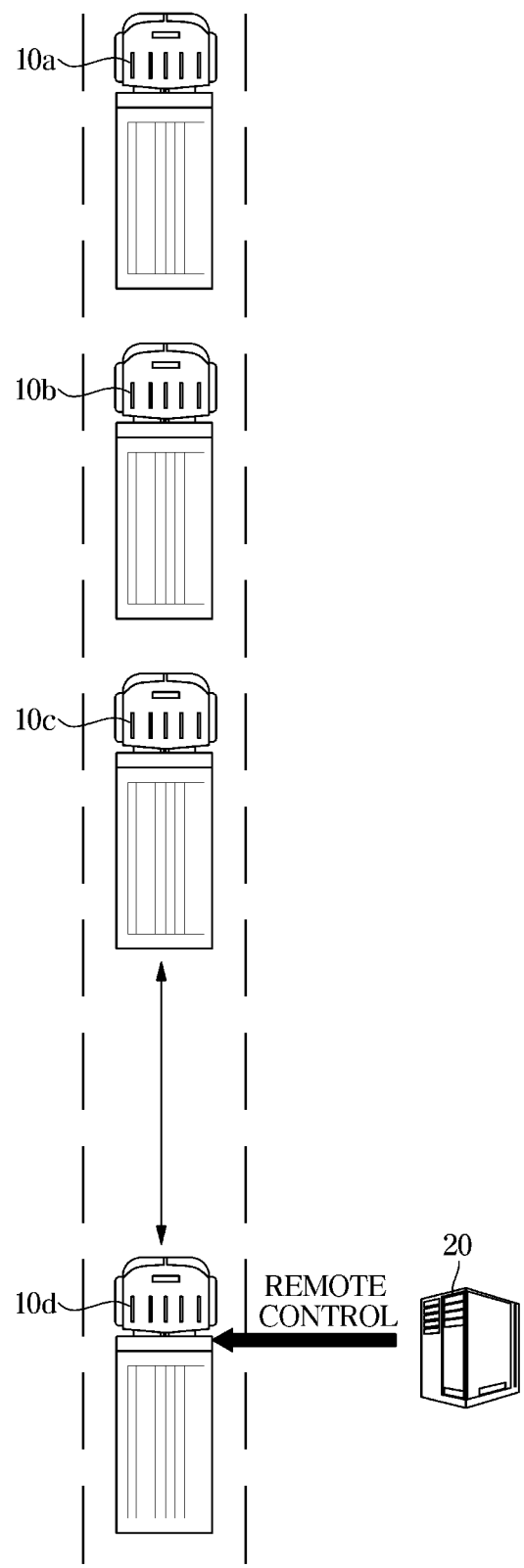

FIG. 1 shows a remote control system for platooning according to an exemplary embodiment of the present disclosure, and FIGS. 2A, 2B, and 2C show examples of a separation in platooning.

Referring to FIG. 1, a platooning remote control system 1 according to an exemplary embodiment may include a plurality of vehicles 10a, 10b, 10c, and 10d (collectively, 10), a server 20, and a network 30.

The plurality of vehicles 10 may perform platooning in which vehicles are driven in groups and may include a leading vehicle (LV) 10a and one or more following vehicles (FVs) 10b, 10c, and 10d following the LV 10a.

Although FIG. 1 illustrates three FVs 10b, 10c, and 10d as an example, the number of FVs is not limited in the present disclosure, and one or more FVs may exist in a platoon of vehicles. Hereinafter, three FVs 10b, 10c, and 10d will be described as an example.

The LV 10a may transmit vehicle control information to the FVs 10b, 10c, and 10d via vehicle to vehicle (V2V) communication. The vehicle control information may include a control instruction for a driving device that allows the FVs 10b, 10c, and 10d to travel in response to a driving of the LV 10a. At this time, the driving device may include a power device that transmits power to wheels of the vehicle, a braking device that brakes the wheels, and a steering device that steers the wheels.

The FVs 10b, 10c, and 10d may perform an autonomous driving to follow the LV 10a based on the vehicle control information received from the LV 10a. Furthermore, the FVs 10b, 10c, and 10d may perform an autonomous driving based on the vehicle control information and output information of a detecting device, according to an exemplary embodiment. In this case, the detecting device may include a sensor that has a forward field of sensing facing in front of the vehicle and outputs forward detection data, and the detecting device may include, for example, at least one of a camera, a radar, and a light detection and ranging (lidar).

Accordingly, the vehicles 10a, 10b, 10c, and 10d included in a platoon of vehicles may perform platooning while maintaining a certain distance from each other, thereby increasing fuel efficiency by minimizing air resistance, and minimizing labor cost by driving the FVs 10b, 10c, and 10d without drivers.

Furthermore, the vehicles 10a, 10b, 10c, and 10d included in the platoon of vehicles may communicate with the server 20 using vehicle to infrastructure (V2I) communication, according to an exemplary embodiment. In other words, the vehicle 10 may communicate with the server 20 via the network 30. In this case, the network 30 may correspond to a known type of network supporting wireless communication between the vehicle 10 and the server 20.

More specifically, when a vehicle separated from the platoon of vehicles among the FVs 10b, 10c, and 10d occurs, the corresponding (separated) vehicle may request a remote control to the server 20, and the server 20 may transmit a remote control instruction to the corresponding vehicle, leading to allowing the separated vehicle to rejoin the platoon of vehicles.

In this case, the remote control instruction may include vehicle control information for controlling the driving device so that the corresponding vehicle may approach the platoon of vehicles and may also include platooning information for allowing the corresponding vehicle to perform platooning with the platoon of vehicles.

In other words, the FV separated from the platoon of vehicles among the FVs 10b, 10c, and 10d may perform platooning by sharing vehicle control information via V2V communication and join a preceding platoon of vehicles through platooning.

For example, as shown in FIG. 2A, the FV 10c and the FV 10d that is a following vehicle of the FV 10c may be separated from the platoon of vehicles due to an occurrence of a problem in the FV 10c.

In addition, as shown in FIG. 2B, during a lane change of the LV 10a, the FV 10c and the FV 10d that is the following vehicle of the FV 10c may be separated from the platoon of vehicles due to another vehicle 15 presenting in a change lane.

In addition, as shown in FIG. 2C, when oscillation intensifies within the platoon of vehicles due to frequent speed changes of the LV 10a, the FV 10c may be separated from the platoon of vehicles.

As such, when the FV is separated from the platoon of vehicles, the server 20 transmits the remote control instruction to the FV so that the FV and one or more vehicles following the FV may rejoin the platoon of vehicles. However, a situation in which the FVs are separated from the platoon of vehicles shown in FIGS. 2A to 2C is merely an example, and there may be various situations such as a situation in which any other vehicle cuts in between the FVs.

Remote control of the FV by the server 20 will be described in detail later.

In the above, each configuration of the platooning remote control system 1 and the operations of the system 1 have been briefly described. Hereinafter, each configuration of the vehicle 10 and the server 20 and the remote control performed by the server 20 will be described in detail.

Figure 3:
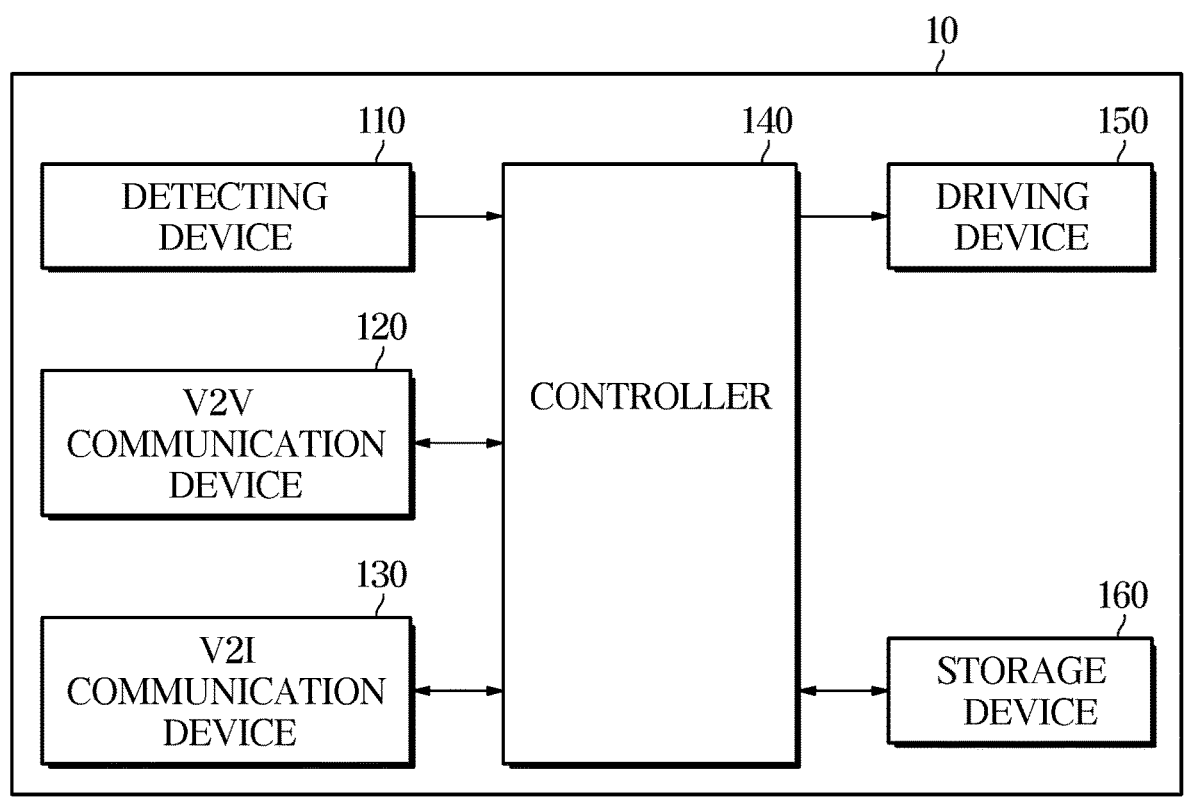
FIG. 3 is a control block diagram illustrating a vehicle according to an exemplary embodiment of the present disclosure.

FIG. 3 is a control block diagram of a vehicle 10 according to an exemplary embodiment of the present disclosure.

Referring to FIG. 3, a vehicle 10 according to an exemplary embodiment may include a detecting device no that has a forward field of sensing of the vehicle 10 and obtains forward detection data, a V2V communication device 120 that communicates with one or more surrounding vehicles, a V2I communication device 130 that communicates with the server 20, a controller 140 that requests a remote control when separated from the platoon of vehicles and performs an autonomous driving based on a remote control instruction received from the server 20, a driving device 150 for driving the vehicle 10, and a storage device (e.g., a memory) 160 including various types of information required for control.

The detecting device no according to an exemplary embodiment may have a forward field of sensing of the vehicle 10 and obtain forward detection data. To this end, the detecting device no may include at least one of a camera, a radar, and a lidar.

The V2V communication device 120 according to an exemplary embodiment may perform V2V communication to communicate with one or more surrounding vehicles. For example, the V2V communication device 120 may receive vehicle control information from the LV or transmit forward detection data to any other vehicle included in the platoon of vehicles. Furthermore, when the vehicle 10 performs a role of the LV, the V2V communication device 120 may transmit vehicle control information to any other vehicle included in the platoon of vehicles. To this end, the V2V communication device 120 may be provided with a known type of wireless communication module such as a Wi-Fi module.

The V2I communication device 130 according to an exemplary embodiment may perform V2I communication to communicate with an external server 20. For example, the V2I communication device 130 may transmit a remote control request to the server 20 or receive a remote control instruction from the server 20. To this end, the V2I communication device 130 may be provided with a known type of wireless communication module capable of performing a wireless communication.

The controller 140 according to an exemplary embodiment may control the driving device 150 to perform platooning with surrounding vehicles based on the vehicle control information and forward detection data received from surrounding vehicles through the V2V communication device 120. The vehicle control information may include control instructions for the driving device 150 that allows the FV to drive in response to the driving of the LV.

The controller 140 according to an exemplary embodiment, in response to a distance between the vehicle 10 and the platoon of vehicles being equal to or greater than a certain distance based on the forward detection data, may determine that the vehicle 10 is separated from the platoon of vehicles and control the V2I communication device 130 to transmit the remote control request to the server 20.

At this time, according to an embodiment, the controller 14o, in response to the distance between the vehicle 10 and the platoon of vehicles being maintained to be equal to or greater than the certain distance for a predetermined time, may control the V2I communication device 130 to transmit the remote control request.

Upon receiving the remote control instruction from the server 20, the controller 140 according to an exemplary embodiment may control the driving device 150 to drive based on the remote control instruction. In this case, the remote control instruction may include vehicle control information allowing the vehicle 10 to rejoin the separated platoon of vehicles.

In this case, according to an exemplary embodiment, upon receiving the remote control instruction, the controller 140 may control the V2V communication device 120 to transmit the vehicle control information corresponding to the remote control instruction to the following vehicle that is included in the platoon of vehicles. Accordingly, the vehicle 10 and the vehicle following the vehicle 10 may form another group (or platoon) of vehicles to perform platooning and may drive to join the separated platoon of vehicles.

In this case, the remote control instruction may include platooning information to increase a distance between the vehicle 10 and the vehicle following the vehicle 10 by an interval corresponding to the V2I communication delay. In other words, the remote control instruction may increase stability by compensating for the delay in the V2I communication by widening the distance between the vehicles in platooning rather than that in platooning using the V2V communication.

The controller 140 according to an exemplary embodiment, upon determining that a distance between the vehicle 10 and the platoon of vehicles falls within a certain distance based on the forward detection data while driving based on the remote control instruction, may control to be joined with the platoon of vehicles.

At this time, according to an exemplary embodiment, the controller 140 may control to be joined with the platoon of vehicles, in response to the vehicle 10 being located in the same lane as the platoon of vehicles and being located within the certain distance from the platoon of vehicles based on the forward detection data.

The controller 140, according to an exemplary embodiment, may control the V2I communication device 130 to transmit a joining request to the server 20 when controlling to join the platoon of vehicles and may control the V2V communication device 120 to receive the vehicle control information from the vehicle included in platooning (e.g., the LV) based on the V2V communication information in response to receiving the V2V communication information from the server 20.

Furthermore, according to an exemplary embodiment, when controlled to join the platoon of vehicles, the controller 140 may control the V2V communication device 120 to transmit the joining request to the LV of the platoon of vehicles, and in response to receiving a joining permission signal from the LV, the controller 140 may control the V2V communication device 120 to receive the vehicle control information from the LV.

The controller 140 according to an exemplary embodiment may control the V2I communication device 130 to transmit a remote control release request to the server 20 when joining the platoon of vehicles.

The controller 140 may include at least one memory in which a program for performing the above-described operations and an operation to be described later is stored and at least one processor for executing the stored programs. When there are a plurality of memories and processors, they may be integrated on one chip or may be provided in physically separate locations.

The driving device 150 according to an exemplary embodiment may drive the vehicle 10. To this end, the driving device 150 may include a power device for transmitting power to the wheels of the vehicle, a braking device for braking the wheels, and a steering device for steering the wheels. For example, the power device may be an engine or a motor, and the braking unit may correspond to a brake.

The storage device 160 according to an exemplary embodiment may store various types of information required for control, for example, vehicle control information and remote control instructions. To this end, the storage device 160 may be provided as a known type of storage medium.

Figure 4:
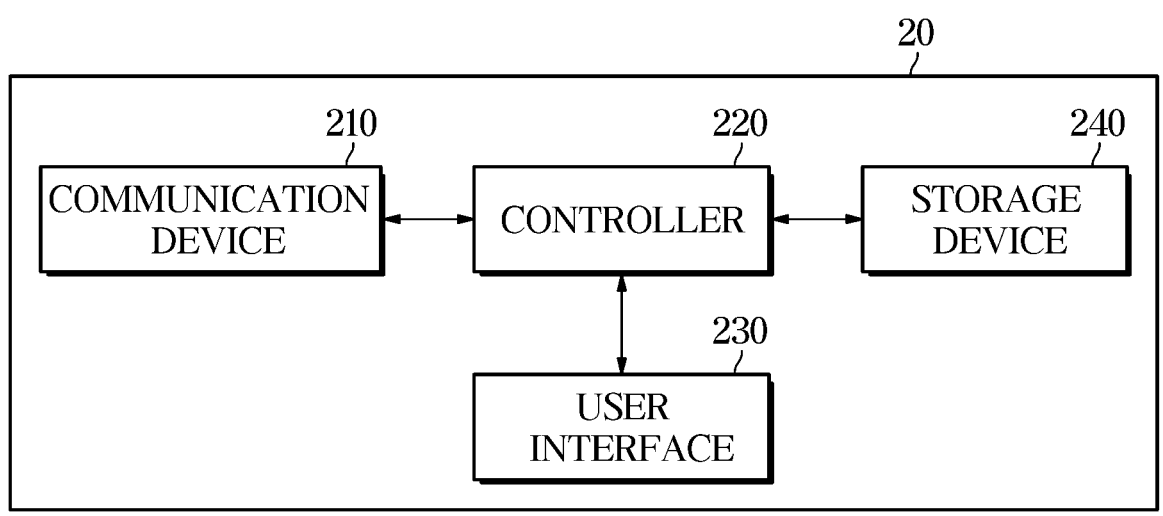
FIG. 4 is a control block diagram illustrating a server according to an exemplary embodiment of the present disclosure.

FIG. 4 is a control block diagram of the server 20 according to an exemplary embodiment.

Referring to FIG. 4, the server 20 according to an exemplary embodiment may include a communication device 210 that communicates with the vehicle 10, a controller 220 that generates a remote control instruction for controlling the vehicle 10, a user interface 230 that receives a user input and displays various information, and a storage device (e.g., a memory) 240 that stores various information required for control.

The communication device 210 according to an exemplary embodiment may communicate with the vehicle 10 via the network 30. To this end, the communication device 210 may be provided with a known type of wireless communication module.

In response to receiving a remote control request from the vehicle 10 separated from a first platooning through the communication device 210, the controller 220 according to an exemplary embodiment may control the communication device 210 so that the vehicle 10 transmits a remote control instruction for joining the first platooning. In this case, the remote control instruction may be determined by a user input through the user interface 230 or may be automatically determined by the controller 220 without a user input according to exemplary embodiments. In response to determining the remote control instruction without a user intervention, the controller 220 may determine the remote control instruction for allowing the vehicle 10 to approach the first platooning based on the forward detection data received from the vehicle 10.

In this case, the remote control instruction may include the vehicle control information and platooning information for a second platooning of the vehicle 10 and a vehicle following the vehicle 10.

In this case, the controller 220, according to an embodiment, may generate the remote control instruction to include the platooning information to increase the distance between the vehicle 10 and the vehicle following the vehicle 10 by the interval corresponding to the V2I communication delay.

The first platooning corresponds to a platooning to which the vehicle 10 that transmitted the remote control request and the vehicle following the vehicle 10 belong. The second platooning corresponds to a platooning which the vehicle 10 separated from the first platooning and the vehicle following the vehicle 10 perform.

Upon receiving a joining request for the first platooning from the vehicle 10, the controller 220 according to an exemplary embodiment may control the communication device 210 to transmit the joining request to the LV of the first platooning, and upon receiving a joining permission signal from the LV, the controller 220 according to an exemplary embodiment may transmit the V2V communication information in the first platooning to the vehicle 10.

The controller 220 according to an exemplary embodiment may control the user interface 230 to display at least one of a guideline for remote control of the second platooning, position information on the second platooning, and position information on the first platooning.

In other words, a platoon remote driving, unlike a single remote driving, should avoid fast longitudinal/lateral control to secure followability of the following vehicle, so a guideline for guiding the avoidance of fast longitudinal/lateral control may be displayed on the user interface 230.

Furthermore, information on each of the platoons of vehicles may be displayed on the user interface 230 so that the second platooning, which is a target of the remote control, may join the first platooning.

The controller 220 may include at least one memory in which a program for performing the above-described operations and an operation to be described later is stored and at least one processor for executing the stored program. When there are a plurality of memories and processors, they may be integrated on one chip or may be provided in physically separate locations.

The storage device 240 according to an exemplary embodiment may store position information of a rank of the first platooning, position information of a rank of the second platooning, and various information for generating a remote control instruction, and to this end, may be provided as a storage medium of a known type.

Figure 5:
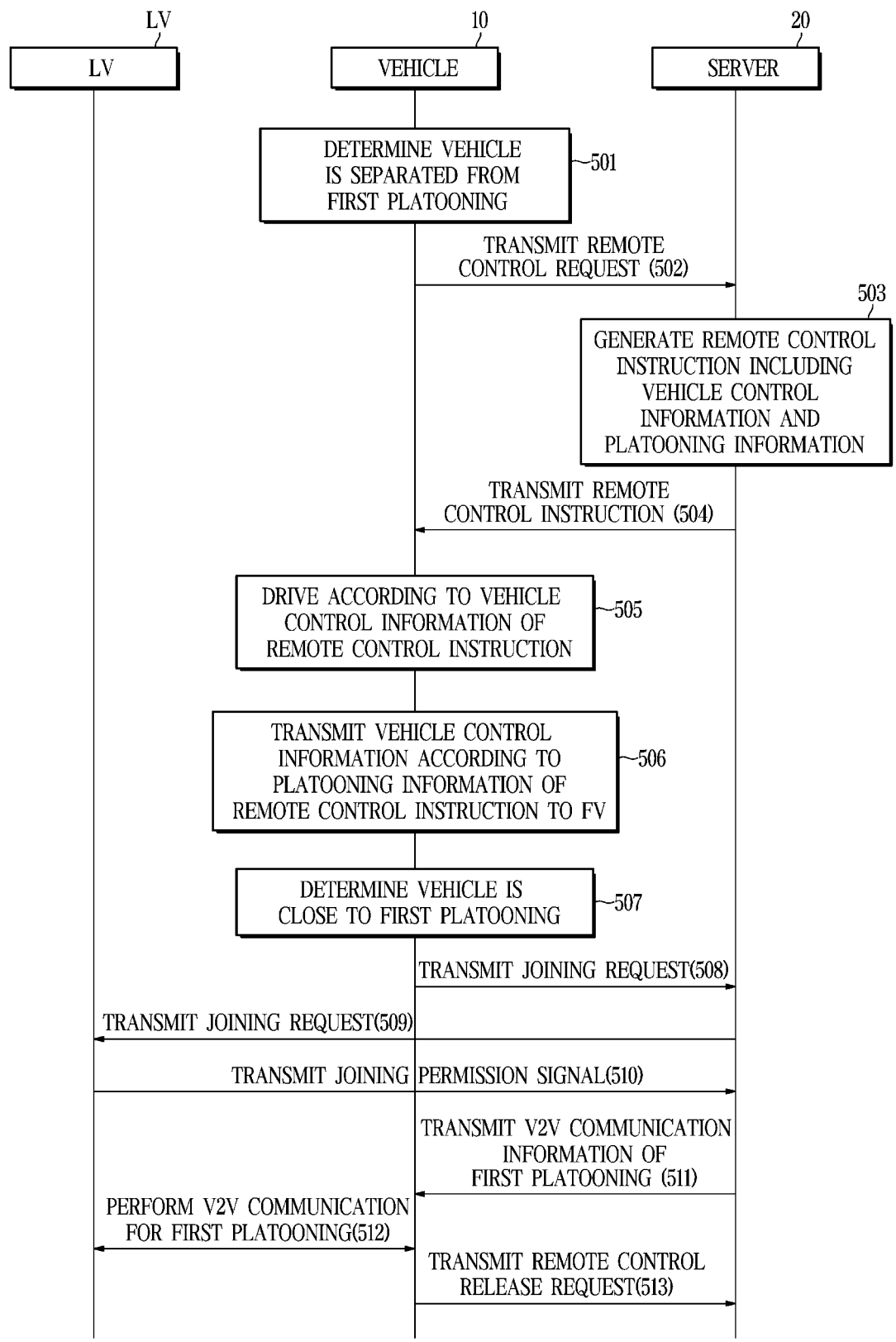
FIG. 5 is a signal flow diagram when a vehicle according to an exemplary embodiment of the present disclosure is separated from a platoon of vehicles.
Figure 6:
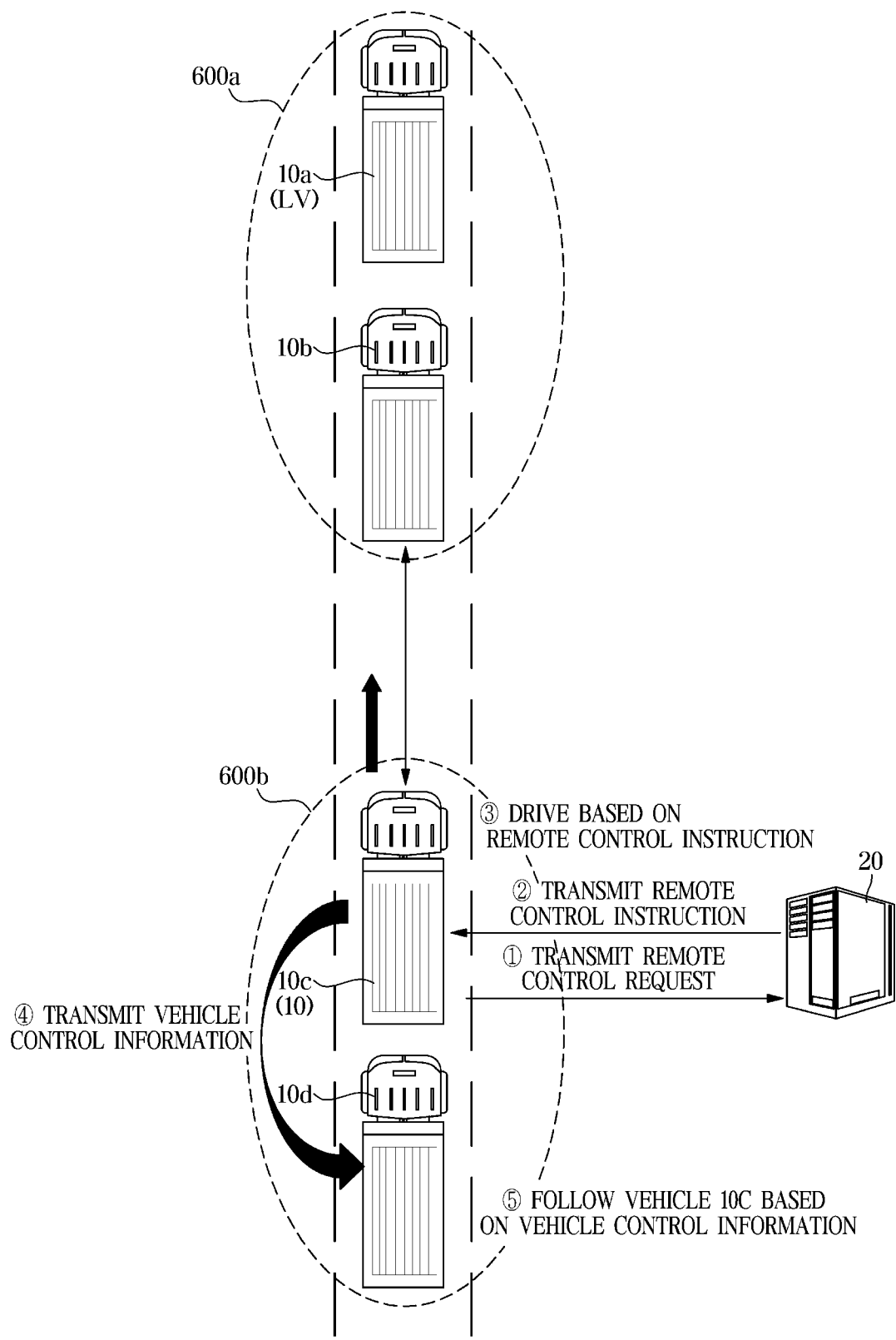
FIG. 6 shows an example of driving by remote control when a vehicle according to an exemplary embodiment of the present disclosure is separated from the platoon of vehicles.
Figure 7:
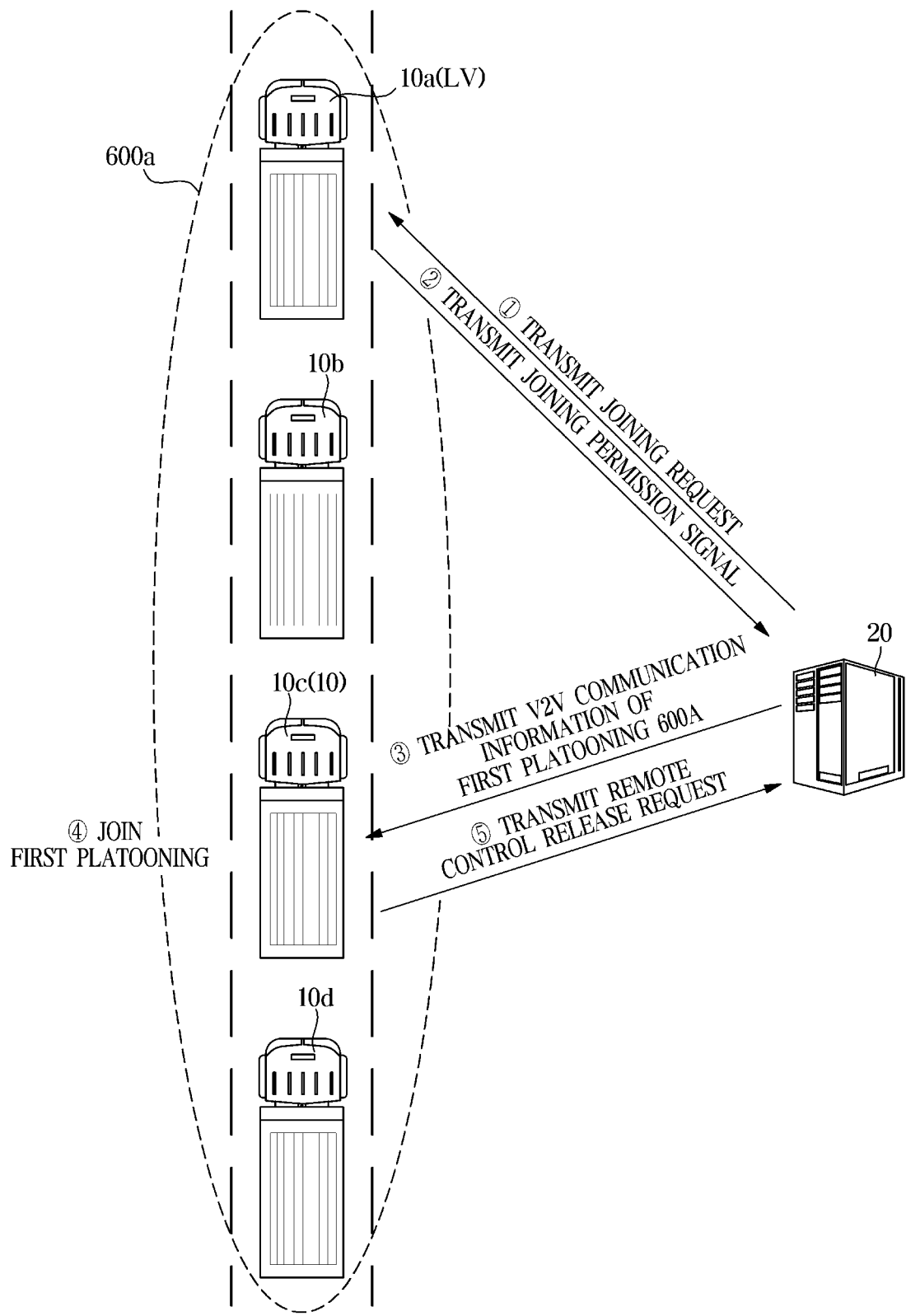
FIG. 7 shows an example of a case in which a vehicle according to an exemplary embodiment of the present disclosure joins the platoon of vehicles.
Figure 8:
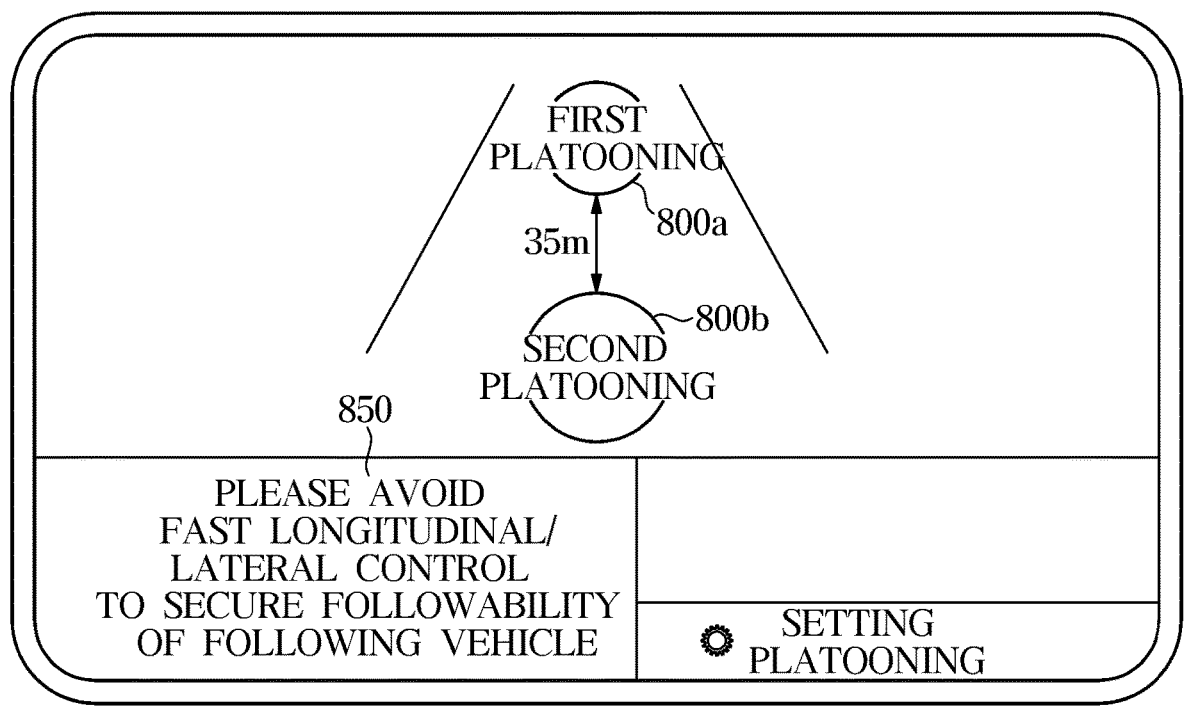
FIG. 8 shows an example in which a server according to an exemplary embodiment of the present disclosure controls a user interface for remote control.

FIG. 5 is a signal flow diagram when the vehicle 10 according to an exemplary embodiment is separated from platooning, FIG. 6 shows an example of driving by the remote control when the vehicle 10 according to an exemplary embodiment is separated from platooning, FIG. 7 shows an example of a case in which the vehicle 10 according to an exemplary embodiment joins platooning, and FIG. 8 shows an example in which the server 20 according to an exemplary embodiment controls the user interface for the remote control.

Referring to FIGS. 5 to 7, the vehicle 10 according to an exemplary embodiment, upon determining that the vehicle 10 is separated from the first platooning (501), may transmit the remote control request to the server 20 (502).

More specifically, as shown in FIG. 6, the vehicle 10 according to an exemplary embodiment may be the vehicle 10*c* separated from the first platooning 600*a* while performing the first platooning by receiving the vehicle control information from the LV 10*a* of the first platooning 600*a* through the V2V communication device 120.

At this time, upon determining that the distance between the vehicle 10 and the platoon of vehicles is equal to or greater than the certain distance based on the forward detection data, the controller 140 may determine that the vehicle 10 is separated from the platoon of vehicles and control the V2I communication device 130 to transmit the remote control request to the server 20.

In addition, according to an exemplary embodiment, in response to the distance between the vehicle 10 and the platoon of vehicles being maintained for the predetermined time greater than or equal to the certain distance, the controller 140 may control the V2I communication device 130 to transmit the remote control request.

In response to receiving the remote control request from the vehicle 10, the server 20 according to an exemplary embodiment may generate the remote control instruction including the vehicle control information and the platooning information (503), and may transmit the remote control instruction to the vehicle 10 (504).

In this case, the remote control instruction may be determined by the user input through the user interface 230 or may be automatically determined by the controller 220 without the user input according to an exemplary embodiment. When determining the remote control instruction without user intervention, the controller 220 may determine the remote control instruction for allowing the vehicle 10 to approach the first platooning based on the forward detection data received from the vehicle 10.

The remote control instruction, according to an embodiment, may include the vehicle control information and the platooning information for the second platooning of the vehicle 10 and the vehicle 10*d* following the vehicle 10. In this case, the remote control instruction may include the platooning information to increase the distance between the vehicle 10 and the vehicle 10*d* following the vehicle 10 by the interval corresponding to the V2I communication delay.

In this case, as shown in FIG. 8, the server 20 may control the user interface 230 to display a guideline 850 for remote control of the second platooning and at least one of position information on the second platooning 800*b* or position information on the first platooning 800*a*.

In other words, the platoon remote driving, unlike the single remote driving, should avoid fast longitudinal/lateral control to secure followability of the following vehicle, so the guideline 850 for guiding the avoidance of fast longitudinal/lateral control may be displayed on the user interface 230.

Furthermore, information on each of the platooning 800a and 800b may be displayed on the user interface 230 so that the second platooning, which is a target of the remote control, may join the first platooning.

The vehicle 10 according to an exemplary embodiment may drive in accordance with the vehicle control information of the remote control instruction upon receiving the remote control instruction (505), and may transmit the vehicle control information according to the platooning information of the remote control instruction to the FV 10d (506). Accordingly, the FV 10d may follow the vehicle 10 based on the vehicle control information. As a result, the vehicle 10 and the FV 10d may form another platooning 600b to perform the second platooning.

The first platooning corresponds to a platooning to which the vehicle 10 that transmitted the remote control request and the vehicle 10c following the vehicle 10 belong. The second platooning corresponds to a platooning which the vehicle 10 separated from the first platooning and the vehicle 10c following the vehicle 10 perform.

In other words, the vehicle 10 may control the driving device 150 to drive based on the remote control instruction upon receiving the remote control instruction from the server 20. In this case, the remote control instruction may include the vehicle control information allowing the vehicle 10 to rejoin the separated platoon of vehicles.

Furthermore, according to an exemplary embodiment, the vehicle 10, upon receiving the remote control instruction, may control the V2V communication device 120 to transmit the vehicle control information corresponding to the remote control instruction to the FV included in platooning. Accordingly, the vehicle 10 and the vehicle following the vehicle 10 may form another platooning 600b to perform platooning (second platooning), and may drive to join the platooning 600a that was separated.

In this case, the remote control instruction may include the platooning information to increase the distance between the vehicle 10 and the FV Doc by the interval corresponding to the V2I communication delay. In other words, the remote control instruction increases stability by compensating for the delay in the V2I communication by widening the distance between the vehicles in platooning (second platooning) rather than that in platooning using the V2V communication (first platooning).

Upon determining that the vehicle 10 according to an exemplary embodiment is close to the first platooning 600a (507), the vehicle 10 may transmit a request to join the first platooning to the server 20 (508).

In this case, as shown in FIG. 7, the server 20 may transmit the joining request to the LV of the first platooning (509), and the LV may transmit the joining permission signal to the server 20 (510).

Furthermore, when receiving the joining permission signal from the LV, the server 20 may transmit V2V communication information of the first platooning to the vehicle 10 (511).

Accordingly, the vehicle 10 may perform the V2V communication for the first platooning with the LV (512), and may transmit the remote control release request to the server 20 (513).

In other words, in the vehicle 10, the controller 140 according to an exemplary embodiment, upon determining that the distance between the vehicle 10 and the platoon of vehicles falls within the certain distance based on the forward detection data while driving based on the remote control instruction, may be controlled to join the first platooning.

At this time, according to an exemplary embodiment, the vehicle 10 may be controlled to join the first platooning, upon determining that the vehicle 10 is located in the same lane as the first platooning 600a and is located within the certain distance from the first platooning 600a based on the forward detection data.

According to an exemplary embodiment, when controlled to join the first platooning, the vehicle 10 may control the V2I communication device 130 to transmit the joining request to the server 20, and in response to receiving the V2V communication information in platooning from the server 20, the vehicle 10 may control the V2V communication device 120 to receive the vehicle control information from the vehicle (LV) included in the first platooning based on the V2V communication information.

In this case, the FV 10d of the vehicle 10 performing the second platooning may also obtain the V2V communication information from the vehicle 10 and receive the vehicle control information from the LV.

Accordingly, the vehicle 10 and the vehicle 10d following the vehicle 10 that have performed the second platooning 600b may join the first platooning 60a.

However, according to an exemplary embodiment, when controlled to join platooning, the vehicle 10 may control the V2V communication device 120 to transmit the joining request to the LV of platooning, and in response to receiving the joining permission signal from the LV, the vehicle 10 may control the V2V communication device 120 to receive the vehicle control information from the LV.

As such, the platooning remote control system 1, when a vehicle separated from the platoon of vehicles presents, remotely controls the corresponding vehicle or the group including the corresponding vehicle and the vehicle following the corresponding vehicle to rejoin the platoon of vehicles, so that there is no need for a driver to ride in the FV. Accordingly, labor costs may be improved and quick joining to the platoon of vehicles may be ensured, thereby improving fuel efficiency.

Hereinafter, a method of controlling the vehicle 10 and the server 20 according to an exemplary embodiment will be described. The vehicle 10 and the server 20 according to the above-described embodiments may be applied to a method of controlling the vehicle 10 and the server 20 to be described later. Accordingly, the above description with reference to FIGS. 1 to 8 may be equally applied to a method of controlling the vehicle 10 and the server 20 according to an exemplary embodiment even if there is not any particular mention.

Figure 9:
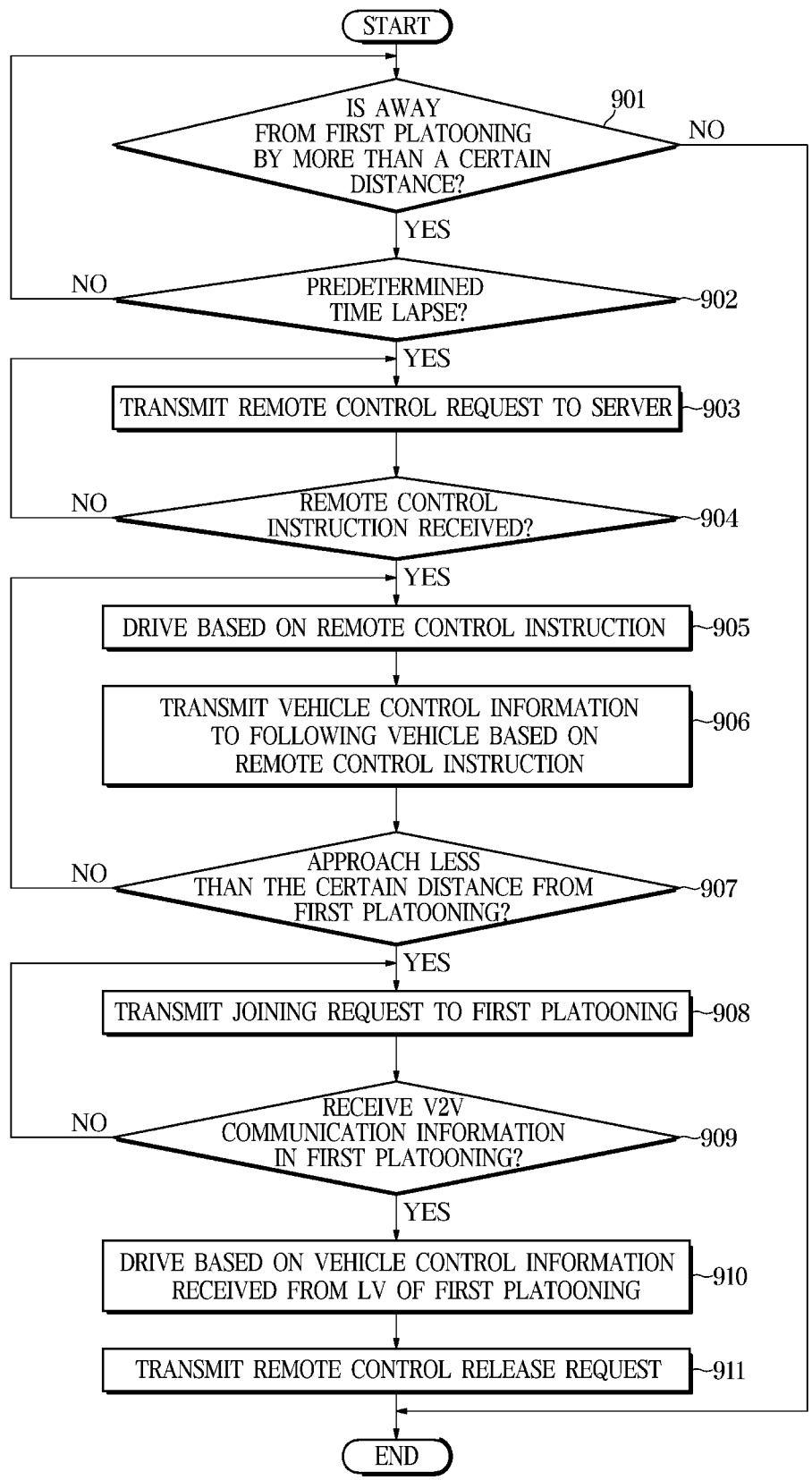
FIG. 9 is a flowchart illustrating a case in which a vehicle is separated from the platoon of vehicles in a method of controlling the vehicle according to an exemplary embodiment of the present disclosure.

FIG. 9 is a flowchart illustrating a case in which the vehicle 10 is separated from the platoon of vehicles in a method of controlling the vehicle 10 according to an exemplary embodiment of the present disclosure.

Referring to FIG. 9, the vehicle 10 according to an exemplary embodiment is in a state that the vehicle 10 is away from the first platooning 600a by more than a certain distance (Yes in 901), and when a predetermined time elapses (Yes in 902), the vehicle 10 may transmit the remote control request to the server 20 (903).

In other words, upon determining that the distance between the vehicle 10 and the platoon of vehicles is more than the certain distance based on the forward detection data, the vehicle 10 may determine that the vehicle is separated from the platoon of vehicles and control the V2I communication device 130 to transmit the remote control request to the server 20.

Upon receiving the remote control instruction from the server 20 (Yes in 904), the vehicle 10 according to an exemplary embodiment may drive based on the remote control instruction (905), and transmit the vehicle control information to the FV 10d based on the remote control instruction (906).

In other words, upon receiving the remote control instruction from the server 20, the vehicle 10 may control the driving device 150 to drive based on the remote control instruction. In this case, the remote control instruction may include the vehicle control information enabling the vehicle 10 to rejoin the separated platoon of vehicles.

Furthermore, according to an exemplary embodiment, upon receiving the remote control instruction, the vehicle 10 may control the V2V communication device 120 to transmit the vehicle control information corresponding to the remote control instruction to the FV 10d included in platooning. Accordingly, the vehicle 10 and the vehicle 10d following the vehicle 10 may form another platooning 600b to perform platooning and may travel to join the separate platooning 600a.

In this case, the remote control instruction may include the platooning information to increase the distance between the vehicle 10 and the vehicle 10d following the vehicle 10 by the interval corresponding to the V2I communication delay. In other words, the remote control instruction may improve stability by compensating for the delay in the V2I communication by making the distance (or headway) between the vehicles in the platooning 600b (second platooning) wider than that in the platooning using the V2V communication (first platooning).

Upon approaching less than the certain distance from the first platooning 600a (Yes in 907), the vehicle 10 according to an exemplary embodiment may transmit the joining request to the first platooning to the server 20 (908). In addition, upon receiving the V2V communication information in the first platooning (YES in 909), the vehicle 10 according to an exemplary embodiment may drive based on the vehicle control information received from the LV of the first platooning (910), and transmit the remote control release request to the server 20 (911).

In other words, upon determining that the distance between the vehicle 10 and the first platooning 600a falls within the certain distance based on the forward detection data while driving based on the remote control instruction, the vehicle 10 may be controlled to join the first platooning.

At this time, according to an exemplary embodiment, the vehicle 10 may be controlled to join the first platooning, upon determining that the vehicle 10 is located in the same lane as the first platooning 600a and is located within the certain distance from the first platooning 600a based on the forward detection data.

According to an exemplary embodiment, when controlled to join the first platooning, the vehicle 10 may control the V2I communication device 130 to transmit the joining request to the server 20, and in response to receiving the V2V communication information in the first platooning from the server 20, the vehicle 10 may control the V2V communication device 120 to receive the vehicle control information from the LV included in the first platooning based on the V2V communication information.

However, according to an exemplary embodiment, when controlled to join the first platooning, the vehicle 10 may control the V2V communication device 120 to transmit the joining request to the LV of the first platooning, and in response to receiving the joining permission signal from the LV, the vehicle 10 may control the V2V communication device 120 to receive the vehicle control information from the LV.

The vehicle 10 according to an exemplary embodiment may control the V2I communication device 130 to transmit the remote control release request to the server 20 when joining platooning.

Figure 10:
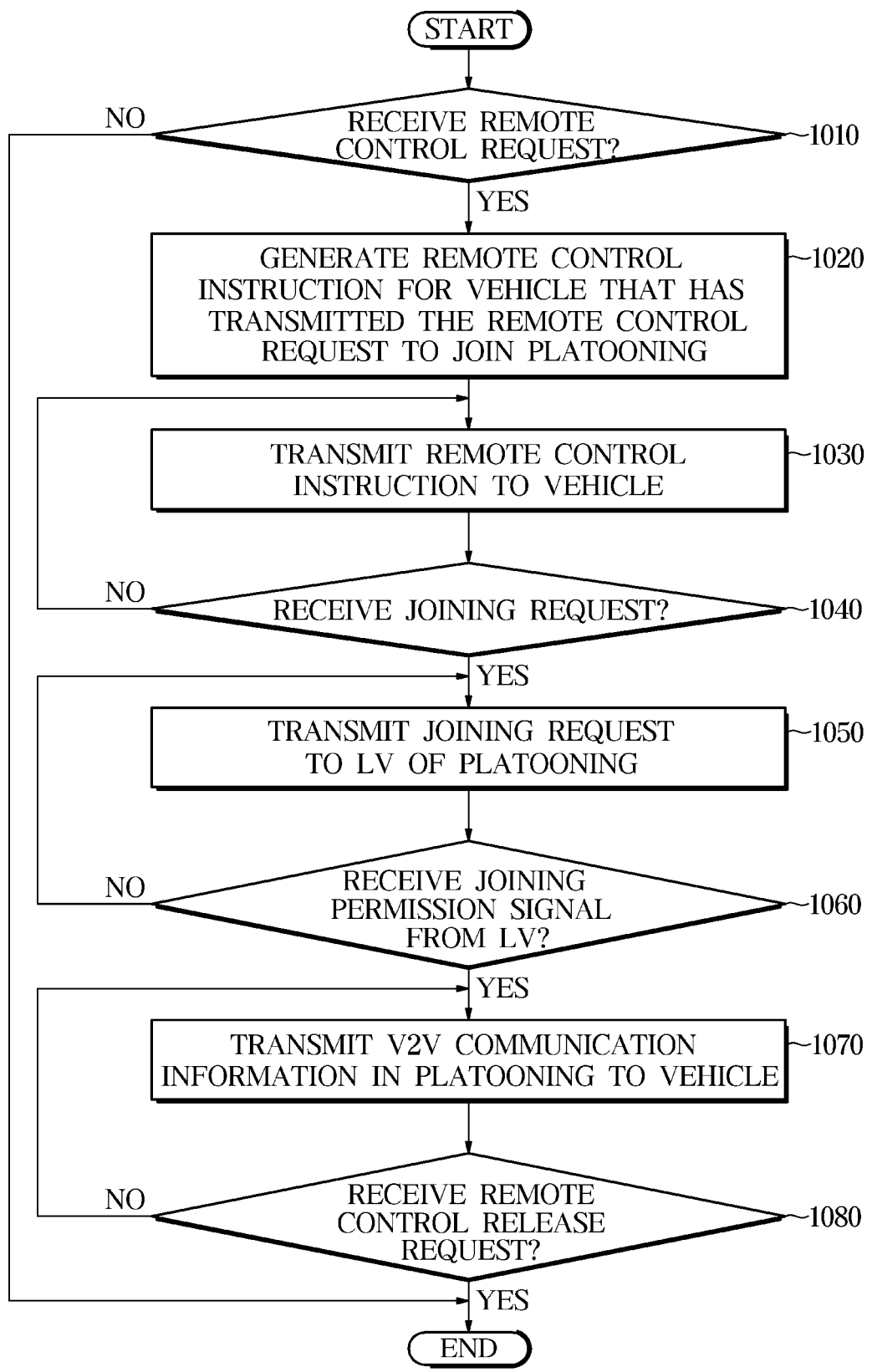
FIG. 10 is a flowchart illustrating a case of performing remote control in a method of controlling a server according to an exemplary embodiment of the present disclosure.

FIG. 10 is a flowchart illustrating a case in which the remote control is performed in a method of controlling the server 20 according to an exemplary embodiment of the present disclosure.

Referring to FIG. 10, the server 20 according to an exemplary embodiment, upon receiving the remote control request from the vehicle 10 (Yes in 1010), may generate the remote control instruction for the vehicle 10 that has transmitted the remote control request to join the platoon of vehicles (1020), and transmit the remote control instruction to the vehicle 100 (1030).

In other words, upon receiving the remote control request from the vehicle 10 separated from the first platooning through the communication device 210, the server 20 may control the communication device 210 to transmit the remote control instruction for the vehicle 10 to join the first platooning. In this case, the remote control instruction may be determined by the user input through the user interface 230 or may be automatically determined by the controller 220 without the user input according to an exemplary embodiment. Upon determining the remote control instruction without a user intervention, the controller 220 may determine the remote control instruction for allowing the vehicle 10 to approach the first platooning based on the forward detection data received from the vehicle 10.

In this case, the remote control instruction may include the vehicle control information and the platooning information for the second platooning of the vehicle 10 and the vehicle following the vehicle 10.

At this time, the server 20, according to an embodiment, may generate the remote control instruction to include the platooning information to increase the distance between the vehicle 10 and the vehicle following the vehicle 10 by the interval corresponding to the V2I communication delay.

The first platooning corresponds to a platooning to which the vehicle 10 that transmitted the remote control request and the vehicle following the vehicle 10 belong. The second platooning corresponds to a platooning which the vehicle 10 separated from the first platooning and the vehicle following the vehicle 10 perform.

Upon receiving the joining request from the vehicle 10 (Yes in 1040), the server 20 according to an exemplary embodiment may transmit the joining request to the LV of the platoon of vehicles (1050), and upon receiving the joining permission signal from the LV (Yes in 1060), the server 20 according to an exemplary embodiment may transmit the V2V communication information in the platoon of vehicles to the vehicle 10 (1070). In addition, upon receiving the remote control release request from the vehicle 10 (Yes in 1080), the server 20 may terminate control procedure.

As is apparent from the above, according to various embodiments of the present disclosure, the vehicle, the server, and the methods of controlling the vehicle and the server, when a vehicle is separated from the platoon of vehicles, may join the vehicle to the platoon of vehicles through remote control, so that there is no need for a driver to ride in the following vehicle. Accordingly, labor costs may be improved and quick joining to platooning may be ensured, thereby improving fuel efficiency.

On the other hand, the above-described embodiments may be implemented in the form of a recording medium storing commands executable by a computer. The commands may be stored in the form of program code. When the commands are executed by a processor, a program module is generated by the commands so that the operations of the disclosed embodiments may be carried out. The recording medium may be implemented as a computer-readable recording medium.

The computer-readable recording medium includes all types of recording media storing data readable by a computer system. Examples of the computer-readable recording medium include a read only memory (ROM), a random access memory (RAM), a magnetic tape, a magnetic disk, a flash memory, an optical data storage device, or the like.

Although embodiments of the present disclosure have been shown and described, it would be appreciated by those having ordinary skill in the art that changes may be made in these embodiments without departing from the principles and spirit of the present disclosure, the scope of which is defined in the claims and their equivalents.

What is claimed is:

1. A vehicle comprising:
    a driving device;
    a vehicle to vehicle (V2V) communication device;
    a vehicle to infrastructure (V2I) communication device;
    a detecting device having a field of sensing toward an area in front of the vehicle and configured to obtain forward detection data; and
    a controller configured to:
        control the driving device to perform a platoon of vehicles with a surrounding vehicle based on vehicle control information received from the surrounding vehicle through the V2V communication device and the forward detection data;
        control the V2I communication device to transmit a remote control request to an external server upon determining that a distance between the vehicle and the platoon of vehicles is greater than or equal to a certain distance based on the forward detection data;
        control the driving device to drive the vehicle based on a remote control instruction upon receiving the remote control instruction from the external server; and
        control to join the platoon of vehicles based on the vehicle control information received from the surrounding vehicle upon determining that the distance between the vehicle and the platoon of vehicles is within the certain distance based on the forward detection data.

2. The vehicle of claim 1, wherein the controller is further configured to control the V2I communication device to transmit the remote control request in response to the distance between the vehicle and the platoon of vehicles being greater than or equal to the certain distance and the distance being maintained for a predetermined time.

3. The vehicle of claim 1, wherein, upon receiving the remote control instruction, the controller is further configured to control the V2V communication device to transmit vehicle control information corresponding to the remote control instruction to a following vehicle (FV) included in the platoon of vehicles.

4. The vehicle of claim 3, wherein the remote control instruction comprises platooning information to increase a second distance between the vehicle and the FV by an interval corresponding to a V2I communication delay.

5. The vehicle of claim 1, wherein the controller is further configured to control to join the platoon of vehicles upon determining that the vehicle is located in a same lane as the platoon of vehicles and is located within the certain distance from the platoon of vehicles based on the forward detection data.

6. The vehicle of claim 1, wherein the controller is further configured to:
    control the V2I communication device to transmit a joining request to the external server when controlled to join the platoon of vehicles; and
    control the V2V communication device to receive the vehicle control information from the vehicle included in the platoon of vehicles based on V2V communication information in response to receiving the V2V communication information in the platoon of vehicles from the external server.

7. The vehicle of claim 1, wherein the controller is further configured to:
    control the V2V communication device to transmit a joining request to a lead vehicle (LV) of the platoon of vehicles when controlled to join the platoon of vehicles; and
    control the V2V communication device to receive the vehicle control information from the LV in response to receiving a joining permission signal from the LV.

8. The vehicle of claim 1, wherein the controller is further configured to control the V2I communication device to transmit a remote control release request to the external server when joining the platoon of vehicles.

9. A server comprising:
    a communication device; and
    a controller configured to, upon receiving through the communication device a remote control request from a vehicle separated from a first platooning, control the communication device to transmit a remote control instruction for a vehicle to join the first platooning, wherein the remote control instruction comprises vehicle control information and platooning information for a second platooning of the vehicle and a vehicle following the vehicle (FV) and the vehicle control information to control driving of the vehicle and the FV.

10. The server of claim 9, wherein the platooning information comprises information to increase a distance between the vehicle and the FV by an interval corresponding to a V2I communication delay.

11. The server of claim 9, wherein the controller is further configured to:
    control the communication device to transmit a joining request to a lead vehicle (LV) of the first platooning upon receiving the joining request for the first platooning from the vehicle; and
    control the communication device to transmit V2V communication information in the first platooning to the vehicle upon receiving a joining permission signal from the LV.

12. The server of claim 9, further comprising a user interface, wherein the controller is further configured to control the user interface to display a guideline for remote control of the second platooning, position information on a rank of the second platooning, and position information on a rank of the first platooning.

13. A method of controlling a vehicle that comprises a driving device, a vehicle to vehicle (V2V) communication device, a vehicle to infrastructure (V2I) communication device, and a detecting device having a field of sensing toward an area in front of the vehicle, the method comprising:

controlling the driving device to perform a platoon of vehicles with surrounding vehicles based on vehicle control information received from surrounding vehicles through the V2V communication device and forward detection data from the detecting device;

controlling the V2I communication device to transmit a remote control request to an external server upon determining that a distance between the vehicle and the platoon of vehicles is greater than or equal to a certain distance based on the forward detection data;

controlling the driving device to drive the vehicle based on a remote control instruction upon receiving the remote control instruction from the external server; and controlling to join the platoon of vehicles based on the vehicle control information received from at least one of the surrounding vehicles upon determining that the distance between the vehicle and the platoon of vehicles is less than the certain distance based on the forward detection data.

14. The method of claim 13, wherein controlling the V2I communication device further comprises controlling the V2I communication device to transmit the remote control request in response to the distance between the vehicle and the platoon of vehicles greater than or equal to the certain distance being maintained for a predetermined time.

15. The method of claim 13, further comprising, upon receiving the remote control instruction, controlling the V2V communication device to transmit vehicle control information corresponding to the remote control instruction to a following vehicle (FV) included in the platoon of vehicles.

16. The method of claim 15, wherein the remote control instruction further comprises platooning information to increase a distance between the vehicle and the FV by an interval corresponding to a V2I communication delay.

17. The method of claim 13, wherein controlling to join the platoon of vehicles further comprises controlling to join the platoon of vehicles upon determining that the vehicle is located in a same lane as the platoon of vehicles and is located within the certain distance from the platoon of vehicles based on the forward detection data.

18. The method of claim 13, wherein controlling to join the platoon of vehicles further comprises:

controlling the V2I communication device to transmit a joining request to the external server when controlled to join the platoon of vehicles; and controlling the V2V communication device to receive the vehicle control information from the vehicle included in the platoon of vehicles based on V2V communication information in response to receiving the V2V communication information in the platoon of vehicles from the external server.

19. The method of claim 13, wherein controlling to join the platoon of vehicles further comprises:

controlling the V2V communication device to transmit a joining request to a lead vehicle (LV) of the platoon of vehicles when controlled to join the platoon of vehicles; and controlling the V2V communication device to receive the vehicle control information from the LV in response to receiving a joining permission signal from the LV.

20. The method of claim 13, wherein controlling to join the platoon of vehicles further comprises controlling the V2I communication device to transmit a remote control release request to the external server when joining the platoon of vehicles.

* * * * *